United States Patent [19]

Andresen

[11] 4,195,320
[45] Mar. 25, 1980

[54] RECORD TRACK IDENTIFICATION AND FOLLOWING

[75] Inventor: Rolf Andresen, Broomfield, Colo.

[73] Assignee: International Business Machines Corporation, Armonk, N.Y.

[21] Appl. No.: 906,301

[22] Filed: May 15, 1978

[51] Int. Cl.² .......................... G11B 21/10; G11B 5/82
[52] U.S. Cl. ..................................... 360/78; 360/135; 360/77
[58] Field of Search .................................. 360/77–78, 360/106, 109, 135; 318/636, 561

[56] References Cited

U.S. PATENT DOCUMENTS

| | | | |
|---|---|---|---|
| 3,838,457 | 9/1974 | Palmer | 360/78 |
| 4,027,338 | 5/1977 | Kril | 360/77 |
| 4,048,660 | 9/1977 | Dennison et al. | 360/77 |
| 4,103,314 | 7/1978 | Case | 360/77 |

Primary Examiner—Alfred H. Eddleman
Attorney, Agent, or Firm—Sughrue, Rothwell, Mion, Zinn and Macpeak

[57] ABSTRACT

A record member is provided with a plurality of sector areas, including servo track follow integration areas. The integration areas comprise an equal number of signal bursts representing binary "1" and binary "0" in a predetermined arrangement to identify a plurality of record track location lines. The predetermined arrangement of "1's" and "0's" is generated by the insertion of one of two binary codes which exhibit high self-correlation properties, at positions within the integration areas corresponding to a consecutive number of signal bursts equal to a digit in the address identifying a particular one of the track location lines. The two binary codes are complements, are composed of an odd number of signal bursts and are selected so as to maintain equal the number of signal bursts representing binary "1" and binary "0", respectively, in the servo track follow integration areas. A transducer positioning circuit is provided which has a search mode for detecting addresses of the record track location lines and a servo mode for centering the transducer with respect to a selected one of the record track location lines.

6 Claims, 6 Drawing Figures

RECORD TRACK IDENTIFICATION AND FOLLOWING

BACKGROUND OF THE INVENTION

The present invention generally relates to record track identification and following systems of the type employing a magnetic record medium having a plurality of record tracks and a transducer moved transversely with respect to the record tracks, first in a search mode to identify a desired record track, and then in a servo mode to maintain the transducer centered with respect to the selected record track. More especially, the present invention has a particular application to flexible or floppy disc memories in which the record medium is in the form of a circular disc having a plurality of concentric data tracks on at least one surface of the disc. In such a disc memory, a transducer is moved radially by a positioning apparatus in order first to locate a desired record track and thereafter to follow the selected record track.

One of the problems encountered in the use of flexible discs is the difficulty of keeping the transducer on the record track which has been selected. The reason this is a problem is that, even though the record tracks are recorded in concentric circles on the circular disc, the circular tracks, because of the flexibility of the disc and variations in temperature, atmospheric pressure, mechanical forces and the like, become actually oval or elliptical and do not remain circular. Therefore, the transducer cannot simply be positioned on a desired record track and assumed to follow that track as the disc rotates as with rigid disc memories. Thus, it becomes necessary to provide a servoing system which is effective to maintain the transducer centered with respect to a record track.

Typically, the flexible disc is provided with a plurality of servo sector areas which divide the record tracks into a plurality of data fields. The servo sectors contain information for synchronization, track following and track identification, the latter being in the form of addresses. Generally, the more information required in the servo sector areas, the less area remains for the data fields. Moreover, track following information in the servo sectors is often recorded in offset tracks, sometimes requiring increased separation of data tracks in the radial direction of the disc.

SUMMARY OF THE INVENTION

It is therefore an object of the present invention to provide an improved servo sector pattern in a flexible disc memory wherein the addresses of the record tracks is embedded in the servo blocks. This is accomplished by encoding all addresses as a constant energy value, thereby enabling the use of the servo blocks for both record track identification and null servo track following.

It is another object of the invention to generate position error signals in a track follow mode in such a manner as to provide improved repeatable servoing of the transducer. This is accomplished by implementing a particular position error signal algorithm which substantially eliminates the ambiguity between odd and even record tracks from one servo sector to the next as the flexible disc rotates.

The flexible disc record member according to the invention is provided with servo track follow integration areas within the servo sector areas. The servo track follow integration areas comprise an equal number of signal bursts representing binary "1" and binary "0", respectively, and these signal bursts are arranged in a predetermined pattern according to a sliding modulo code. More particularly, the sliding modulo code is characterized by the insertion of one of two binary codes, which exhibit high self-correlation properties, at positions within the integration areas corresponding to a consecutive number of signal bursts equal to a digit in an address identifying a particular track location line. The two binary codes are complements, are composed of an odd number of signal bursts and are selected so as to maintain equal the number of signal bursts representing "1's" and "0's" in the servo track follow integration areas. The transducer positioning system used in cooperation with this flexible disc is provided with circuitry having a search mode for detecting addresses of the record track location lines and a servo mode for centering the transducer with respect to a selected one of the record track location lines.

A principal advantage of the invention is an improved yield in the manufacturing of the flexible disc. As will become more apparent in the following detailed description, the integration window length for null servo track following is digitally controlled, and this makes it possible to bypass bad spots on the disc which would cause servo dropout. The avoidance of servo dropout enables in situ servo recording without yield reduction because of a greater tolerance to disc imperfections.

BRIEF DESCRIPTION OF THE DRAWINGS

The objects and advantages of the invention will be better understood from the following detailed description with reference to the accompanying drawings, in which.

DETAILED DESCRIPTION OF THE INVENTION

Figure 1:
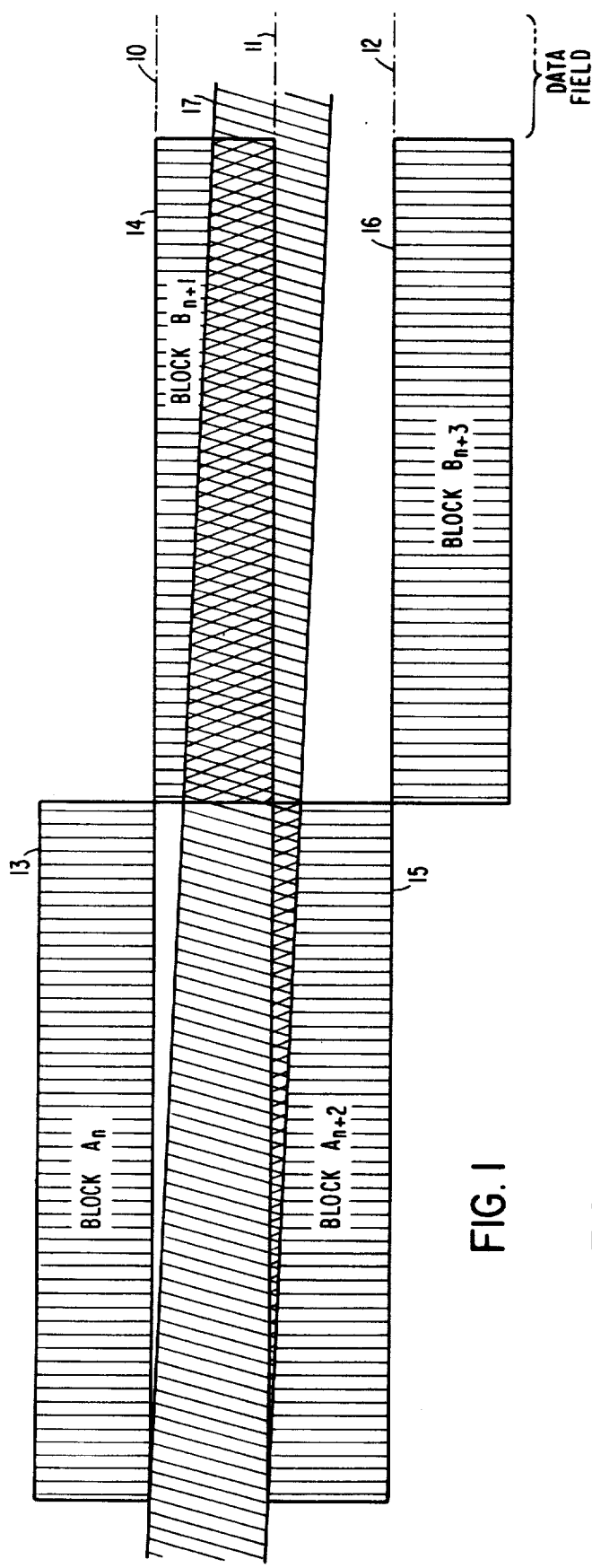
FIG. 1 is a schematic plan view of a portion of a servo sector on a record medium according to the invention.

Referring now to the drawings, and more particularly to FIG. 1 thereof, there is shown schematically a portion of one of a plurality of servo sectors on a flexible disc record medium according to the invention. For purposes of this description, it is to be understood that the horizontal lines in FIG. 1 represent arcuate lines coinciding with the center of record tracks on the disc, and the vertical lines represent radial lines emanating from the center of the disc. Furthermore, in the following discussion, it is assumed that the disc rotates counterclockwise so that the servo sectors precede the corresponding data fields on the disc as they pass the transducer.

Center lines at 10, 11 and 12 represent the centers of record tracks in the data field. These center lines are hereinafter referred to as record track location lines. The servo sector is divided transversely to the record track location lines, with alternating blocks of servo track follow integration areas being located in the divided portions of the servo sector areas. The alternating servo track follow blocks are radially displaced from one another but symmetrically positioned about the record track location lines. For example, block 13 precedes block 14 in the servo sector. Block 14 is located radially inwardly of block 13 but shares a common boundary line which is congruent with the record track location line 10. In like manner, block 15 is located radially inwardly of block 14 but shares a common boundary line which is congruent with record track location line 11. A similar relationship exists for blocks 15 and 16 and record track location line 12. Blocks 13 and 15 are located in one divided portion of the servo sector, and all blocks in this divided portion of the servo sector will be referred to as block "A", with an appropriate subscript as may be required. Blocks 14 and 16 are located in the other divided portion of the servo sector, and all blocks in this divided portion of the servo sector will be referred to as block "B", with an appropriate subscript as may be required. For example, block 13 may be referred to as block $A_n$ which precedes block 14, which in turn may be referred to as block $B_{n+1}$. In like manner, block 15, referred to as block $A_{n+2}$ precedes block 16, which in turn may be referred to as block $B_{n+3}$. The convention is adopted here so that all servo track follow integration block A's contain addresses identifying an odd-numbered record track, while all block B's contain addresses which identify even-numbered record tracks.

Figure 2:
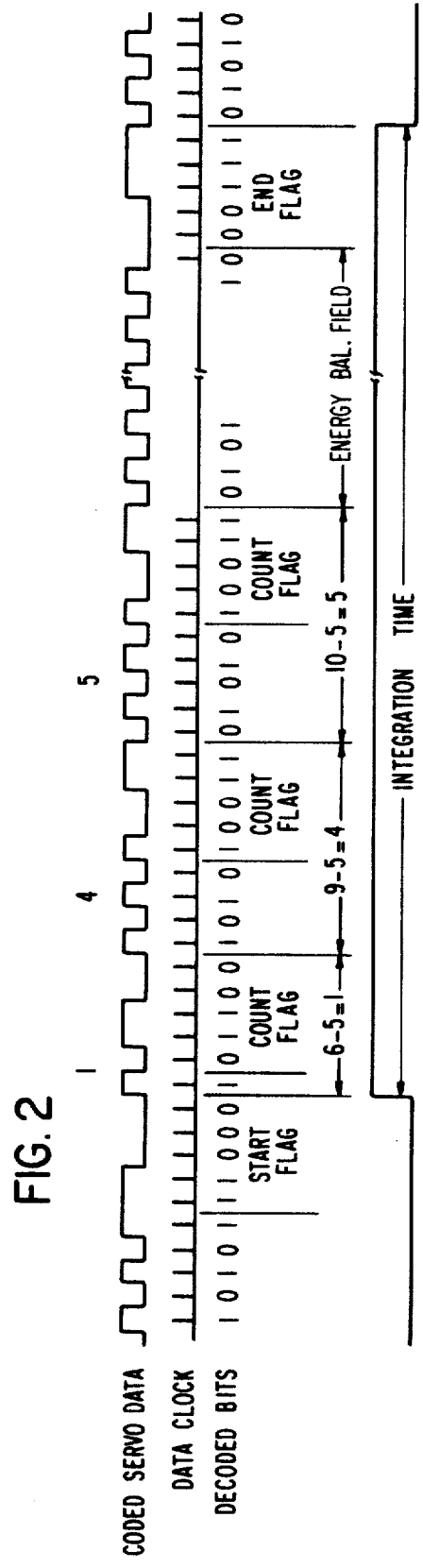
FIG. 2 is a timing diagram illustrating the sliding modulo address code embedded in the servo integration area of one of the blocks in the servo sector shown in FIG. 1.

FIG. 2 is a timing diagram illustrating a block A odd-numbered track address code format in the integration servo data. In order to understand the sliding modulo code used, a specific example of a record track having an address of 145 (decimal) will be described. Reference is particularly made to the second and third lines of the timing diagram which show, respectively, the data clock and the decoded bits which are synchronous with the data clock. The decoded bits represented by binary "1's" and binary "0's" are representative of the signals which are recorded in the servo track follow integration area.

To begin with, assume that the servo track follow integration area is only recorded with alternating "1's" and "0's". As will become more apparent from the following description, this type of servo data is useful for null servo track following. According to the invention, this alternating sequence of "1's" and "0's" is rearranged in a prescribed pattern according to the record track address. In the example shown, this is accomplished with five-bit "flags" which are binary codes that exhibit high self-correlation properties. Two pairs of flags are used, the first pair being start and end flags, and the second pair being count flags. One flag of each pair is the complement of the other. For example, the start flag is the binary code 11000, while the end flag is the binary code 00111. The two count flags are the binary codes 01100 and 10011. The record track address code is preceded by the start flag. This is followed by a count of one of the data clock corresponding to the first decimal digit of the address 145. The count flag 01100 is then inserted to separate the first decimal digit from the second decimal digit. Notice that the count of one of the data clock for the decimal digit happens to correspond with a binary "1" of the decoded bits of the servo data. Therefore, the count flag 01100 is chosen so that the total number of decoded "1's" and 0's" remains equal. This equality is assured by adopting the convention that the count flag 01100 will be inserted after any odd number of decoded binary "1" bits. Next, there follows a count of four data clock pulses corresponding to the second decimal digit of the address. Since an even number of decoded binary "1" bits occurs in this pattern, the count flag 10011 is inserted to separate the second and third digits of the address. The third decimal digit is five, and this is coded as five data clock pulses followed by the count flag 10011 because, during the count of the data clock pulses, there were an even number of decoded binary "1" bits. The effect of choosing one or the other of the two count flags is to maintain an even number of binary "1's" and binary "0's" in the servo track follow integration areas. Thus, each of the addresses is encoded as a constant energy value. The balance of the integration time, defined by the start flag and the end flag, is an energy balance section of variable length depending on the particular address encoded. The servo data preceding the start flag may be used for clock synchronization.

Returning now to FIG. 1, if the address 145 is encoded in block $A_n$, then the address 146 would be encoded in block $B_{n+1}$, address 147 would be encoded in block $A_{n+2}$, address 148 would be encoded in block $B_{n+3}$, and so forth. The hatched track 17 represents the path of the transducer with respect to the flexible disc at the maximum radial velocity of the transducer in the search mode. In the illustration of FIG. 1, if it is assumed that the disc is rotating counterclockwise, then the track 17 represents a radially inwardly movement of the transducer. It will be observed that in this extreme case, the transducer traverses a complete block A followed by a block B, in this case, block 15 followed by block 14 so that the detection of the address 147 is followed by the detection of address 146. If one of these addresses is the desired address, the transducer positioning apparatus is switched to the servo mode. In this mode, the decoded "1's" during the integration time defined by the start flag and the end flag are integrated in one direction for block A and in the other direction for block B.

Figure 3:
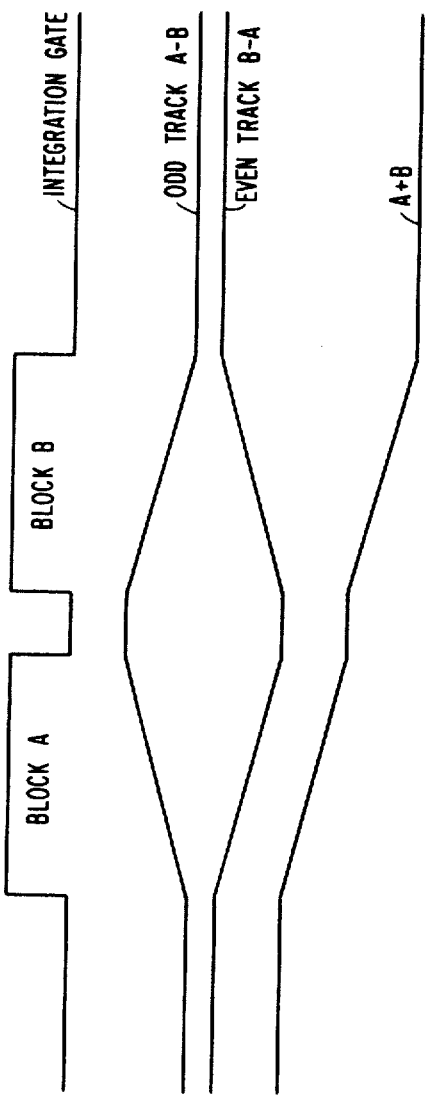
FIG. 3 is a timing diagram illustrating the integration of signals recorded in the servo integration areas of block $A_i$, followed by block $B_{i+1}$ implementing the position error signal algorithm which avoids ambiguity between odd and even record track location lines.

Referring now to FIG. 3, the servoing operation will be explained with the aid of the integration timing diagrams. First, an integration gate is generated by detecting the start and end flags of block A followed by detecting the start and end flags of block B. A position error signal algorithm is adopted so as to avoid the potential ambiguity between odd and even record track lines. More specifically, if the desired record track line is an odd-numbered address, then the decoded "1's" during the integration gate for block A are integrated in a positive direction, and the decoded "1's" in the integration gate for block B are integrated in the negative direction. Alternatively, if the desired record track address is an even number, then the decoded "1's" during the integration gate for block A are integrated in a negative direction, and the decoded "1's" during the integration gate for block B are integrated in the positive direction. In either case, if the transducer is centered on the desired record track line, then the net integration will be zero. However, if the transducer is displaced to one side or the other of center of the record track line, then the net integration will not be zero but some positive or negative value.

With reference again to FIG. 1, if the selected record track address is 146 corresponding to record track line 11, it will be observed that the transducer is, for the most part, above the record track 11 as viewed in the drawing. This means that the analog value of the decoded "1's" detected during the integration gate of block A will be less than the analog value of the decoded "1's" detected during the integration gate of block B. Thus, the absolute value of the negative integration will be less than the absolute value of the positive integration, resulting in a positive error voltage according to the algorithm.

A similar analysis can be made with respect to the selection of an odd-numbered record track address wherein the integration proceeds first in the positive direction and then in the negative direction. However, to demonstrate how the algorithm resolves the ambiguities between odd and even record track lines, refer back to FIG. 1 and assume that the transducer track 17 is displaced upwardly in the figure so that it first traverses block 13 and then block 14, with the result that the track 17 is more closely centered with respect to the record track line 10 than record track line 11. Because the selected address is an even-numbered address, integration of the decoded "1's" during the integration gate for block A proceeds in a negative direction, followed by integration of the decoded "1's" detected during the integration gate for block B in the positive direction. Since the transducer will traverse block B with a greater degree of registry than block A, the net result of the double integration will, again, be a positive error voltage, causing the transducer to be displaced downwardly as shown in the drawing so that the track 17 becomes centered with respect to the record track line 11.

Figure 4:
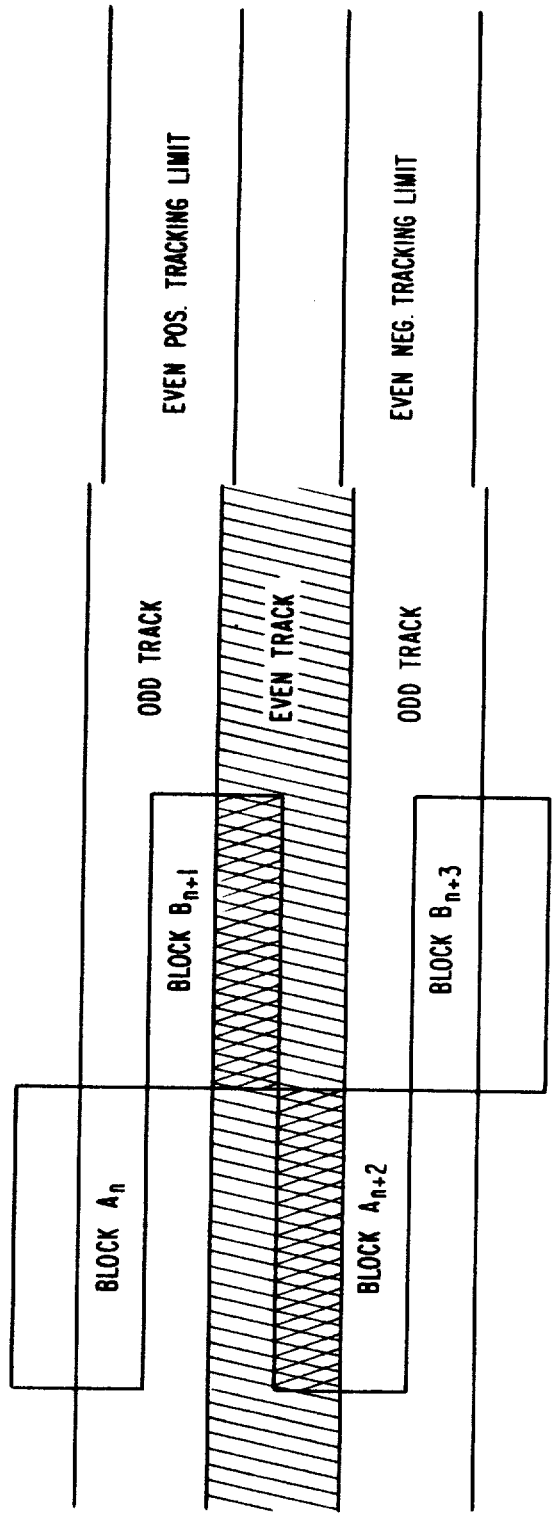
FIG. 4 is a schematic plan view of a portion of a servo sector showing the positive and negative servo tracking limits of an odd track using the position error signal algorithm.

FIG. 4 illustrates the positive and negative tracking limits for the example just given. It will be observed that the positive tracking limit for the even-numbered track just approaches registry with the upper odd-numbered track, and the negative tracking limit just approaches registry with the lower odd-numbered track. Obviously, if the transducer were perfectly in registry with the upper odd-numbered track, then there would be an ambiguity in the tracking of the transducer. Fortunately, the very problems of using flexible disc memories which require the use of servo systems for transducer positioning also guarantee that perfect registry will not be maintained, so the ambiguity is quickly resolved. In the negative tracking limit, the transducer will have approached registry with the lower odd-numbered track, but in so doing, the address for the desired record track line, encoded in the case being considered in block $B_{n+1}$, will no longer be detected, resulting in the transducer positioning system's resuming the search mode.

Returning to FIG. 3, the net result of the odd or even track double integration will be an error signal which is directly proportional to the displacement error of the transducer. Using this error signal directly to position the transducer in the servo track follow mode would result in an under-damped servo system, causing the transducer to oscillate about the desired record track line. To avoid this, the position error signal resulting from the double integration is normalized by dividing the position error signal by the absolute value of the sum of the two integrations. This provides adequate damping to the transducer position servo system so that the transducer is made to approach the desired record track line without oscillation about that line. To summarize, the position error signal (PES) algorithm may be mathematically described as follows:

Odd track: $(A-B)/(A+B)=PES$

Even track: $(B-A)/(A+B)=PES$.

Figure 5:
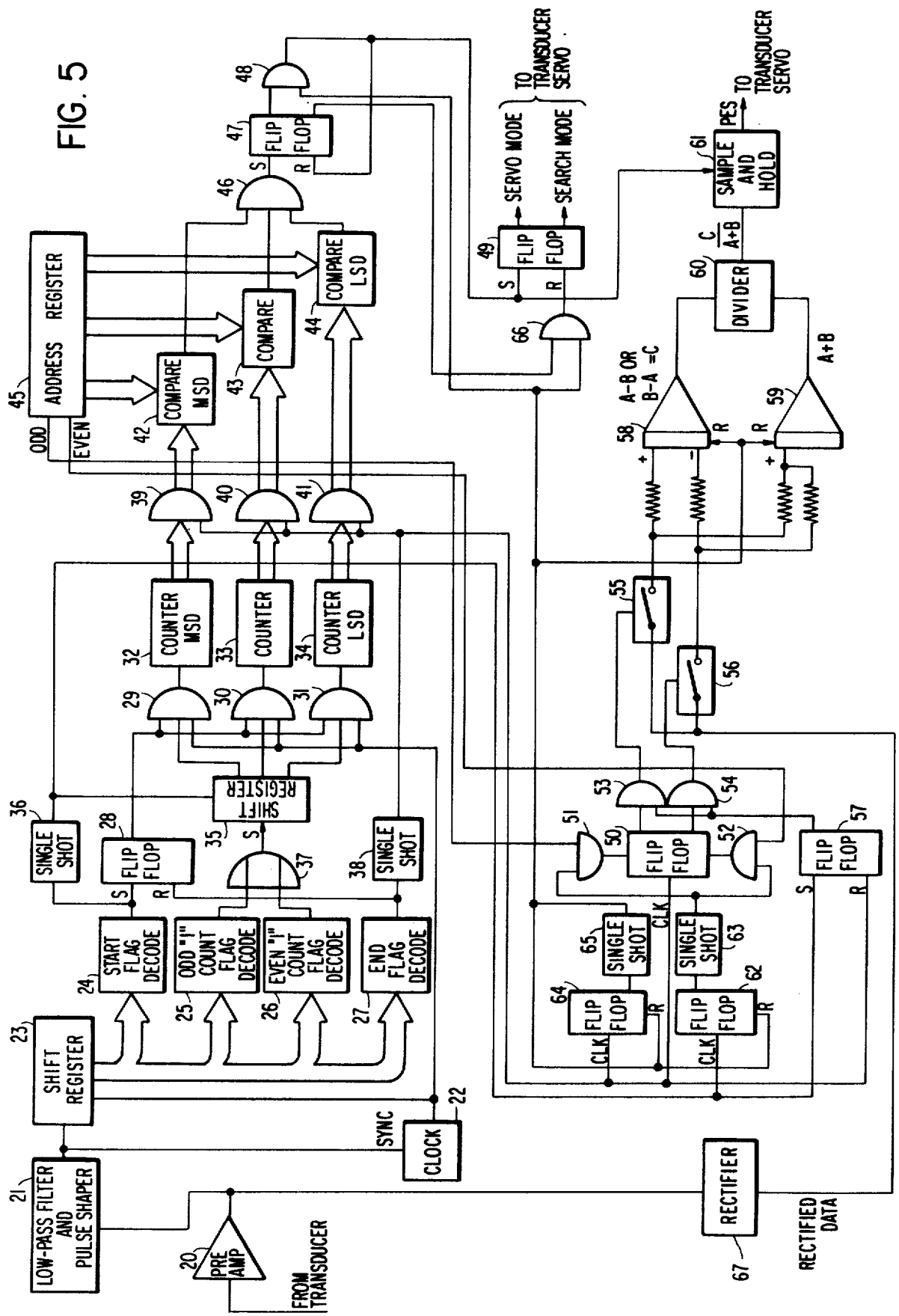
FIG. 5 is a block and logic diagram of the control circuitry used in the transducer positioning system having a search mode for detecting addresses of record track location lines and a servo mode for centering the transducer with respect to a selected record track location line.

Having described the flexible disc record member according to the invention and the theory of operation of the system employing that record member, reference is made to FIG. 5 which illustrates the circuitry for detecting the desired address in the search mode and generating the position error signal for centering the transducer in the servo mode. The signal bursts recorded on the record member are detected by the transducer and amplified by a preamplifier 20. The output of the preamplifier 20 is supplied to a low-pass filter and pulse shaper 21. The reason for the low-pass filter is that the coded servo data recorded in the servo sector has a much lower frequency than the data which is recorded in the data fields. As a result, the low-pass filter eliminates any signals detected by the transducer in the data fields and passes only those signals which are recorded in the servo sectors. The pulse shaping operations are entirely conventional and result in a decoded signal substantially of the form shown at the top of FIG. 2. This signal is supplied both to a clock pulse generator 22 and a shift register 23. The clock pulse generator 22 may be a phase-locked oscillator having a frequency corresponding to the data clock as shown in FIG. 2 so that the output of the low-pass filter and pulse shaper 21 is used as a synchronizing signal. Alternatively, the synchronizing signal for the clock pulse generator could be derived from a tachometer driven by the spindle of the flexible disc drive.

The shift register 23 is a five-bit shift register for the example given where each of the flags is a five-bit binary code. Obviously, if seven-bit or nine-bit binary codes are used for the flags, the shift register would be either a seven-bit or a nine-bit shift register as may be required. The five parallel outputs of the shift register 23 are supplied to each of the four decoders 24, 25, 26 and 27. Each of these decoders is of conventional construction comprising, for example, an AND gate having five inputs, some of which are inverting inputs according to the code to be detected. Decoder 25 detects the five-bit sequence corresponding to the start flag 11000. The output of the start flag decoder 24 sets flip-flop 28 which enables each of the AND gates 29, 30 and 31. Clock pulses are supplied from the clock pulse generator 22 to each of these AND gates which, when selected, pass the clock pulses to corresponding address counters 32, 33 and 34. Selection of one of the AND gates 29, 30 and 31 is made by first loading a binary "1"

into a three-stage shift register 35. This is accomplished by the pulse output from single-shot 36 which is triggered by the output of the start flag decoder 24. Thus, when the start flag decoder 24 provides an output, AND gate 29 will supply clock pulses to counter 32 which accumulates a count corresponding to the most significant digit of the decimal address.

Decoders 25 and 26 respectively detect the odd "1" and even "1" count flags 01100 and 10011. An output from either of these decoders is supplied by way of OR gate 37 to the shift input of shift register 35. This results in the binary "1", which was previously loaded in the first stage of shift register 35, being shifted to the second stage of the shift register so that AND gate 29 is inhibited and AND gate 30 is enabled and so forth. As a result, counter 32 first accumulates a number of clock pulses corresponding to the most significant digit, counter 33 accumulates a number of clock pulses corresponding to the next most significant digit, and counter 34 accumulates a number of clock pulses corresponding to the least significant digit of a three-digit decimal address. It will, of course, be appreciated that because each of the count flags is a five-bit code, each of the counters 32, 33 and 34 will accumulate counts which are five counts greater than the corresponding digit of the decimal address. This greater count, however, is easily accounted for by any number of alternative methods well known to those skilled in the art, such as, for example, ignoring the first five counts of the counter or simply decoding the counter to subtract five from the total accumulated count.

When the end flag is detected by the end flag decoder 27, flip-flop 28 is reset, and single-shot 38 generates an output pulse which is used to gate each of AND gates 39, 40 and 41. As a result of this gating pulse, the accumulated counts in counters 32, 33 and 34 are supplied by the corresponding AND gates 39, 40 and 41 to respective comparator circuits 42, 43 and 44. These comparator circuits are supplied with outputs from an address register 45 which correspond to the three decimal digits of a desired record track address. The address register 45 is loaded by any suitable means, such as a computer which is accessing the disc memory, and since the manner in which this is done is well known to those skilled in the art, no further discussion will be made of the loading of address register 45.

Since each input to the respective comparator circuits 42, 43 and 44 represents one digit of a decimal number, the address in address register 45 is in binary coded decimal (BCD) form. The outputs of each of the comparator circuits 42, 43 and 44 are supplied to respective inputs of AND gate 46. Thus, if the counts accumulated in counters 32, 33 and 34 each respectively correspond to a digit of the desired decimal address, then the AND gate 46 will provide an output which will set flip-flop 47. As will become more apparent from the subsequent description, the output of flip-flop 47 will be sampled by AND gate 48 to set flip-flop 49. Setting of flip-flop 49 indicates that the desired record track address has been detected so that the transducer servo apparatus is switched from the search mode to the servo mode.

In the search mode, flip-flop 50, which is symmetrically triggered by a clocking input from the single-shot 38 signifying the detection of an end flag, controls the direction of the double integration according to the position error signal algorithm described earlier in this specification. Whether the double integration is a positive integration, followed by a negative integration, or a negative integration, followed by a positive integration, is determined by the presetting of flip-flop 50. More specifically, it will be recalled that, according to the position error signal algorithm, if the desired record track address is an odd number, the double integration will be a positive integration followed by a negative integration. This sequence is established by presetting the flip-flop 50 with the output of AND gate 51. AND gate 51 is enabled by an output from address register 45 to indicate that the desired address is an odd-numbered address. In like manner, AND gate 52 is enabled by an output from address register 45 to indicate that the desired address is an even number to preset flip-flop 50.

Let it be assumed for the moment that the desired address is an odd-numbered address so that flip-flop 50 is preset to first enable AND gate 53. At the end of the integration gate for block A, single-shot 38 will produce a clocking pulse to flip-flop 50, causing it to enable AND gate 54 during the integration gate of block B. AND gate 53 controls an analog switch 55, while AND gate 54 controls an analog switch 56. The analog switches 55 and 56 have their inputs connected in common to the output of a full-wave rectifier 67 which receives as its input the output of preamplifier 20. In other words, the signals supplied to the analog switches 55 and 56 are the decoded "1's", but these decoded "1's" will have analog amplitudes which vary according to the registry of the transducer with respect to blocks A and B in the servo sector.

The integration gates shown at the top of FIG. 3 are established by flip-flop 57 which is set by the output pulse from single-shot 36 and reset by the output pulse from single-shot 38. Thus, the flip-flop 57 is set at the detection of each start flag and reset at the detection of each end flag. Flip-flop 57 enables AND gates 53 and 54 so that, in the example being considered, analog switch 55 is closed during the integration gate for block A and analog switch 56 is closed during the integration gate of block B. The outputs of analog switches 55 and 56 are respectively connected to the positive and negative inputs of an analog integrator 58 which will supply as its output the result of the double integration A−B. Alternatively, if the desired record track address is an even-numbered address, flip-flop 50 will first be preset by AND gate 52 so that analog switch 56 is closed during the integration gate for block A and analog switch 55 is closed during the integration gate for block B. This will result in the integrator 58 providing an output which is −A+B or simply B−A. In either event, the output of the integrator 58 will be some value which will be designated as C.

In addition to supplying rectified data to the positive and negative inputs of integrator 58, the outputs of analog switches 55 and 56 are summed and supplied to the positive input of integrator 59. Thus, integrator 59 also performs a double integration, but this integration generates an output corresponding to A+B. According to the position error servo algorithm, the output C of integrator 58 is divided by the output A+B of integrator 59, and this is accomplished by an analog divider 60. The results of this operation are sampled and held by the sample and hold circuit 61 which supplies the position error signal (PES) to the transducer servo apparatus. The sample and hold circuit 61 is sampled by the output of AND gate 48. Thus, a sample pulse to the sample and hold circuit 61 is generated only when the desired address is verified.

Returning now to flip-flop 50, this flip-flop is preset only at the detection of the start flag in a block A. This operation is accomplished by means of a flip-flop 62 which is triggered by a clocking pulse from single-shot 36, thereby causing single-shot 63 to produce a preset pulse which is supplied to each of AND gates 51 and 52. The sampling of the output of divider 60 by the sample and hold circuit 61 occurs only at the end of the block B integration gate. This is accomplished by flip-flop 64 which is triggered by a clocking pulse from single-shot 38. To understand the operation of flip-flop 64, it should first be assumed that the flip-flop is in a reset state. Then, when the first end flag is detected at the end of the integration gate for block A, flip-flop 64 is triggered to assume the opposite state. Subsequently, when the end flag for the integration gate for block B is detected, flip-flop 64 is once again triggered to assume its first or reset state. This change causes single-shot 65 to produce an output pulse which is used to enable gate AND gate 48, thereby supplying the sampling pulse to the sample and hold circuit 61. The output of the single-shot 65 is also used to reset each of flip-flops 62 and 64 and to reset each of integrators 58 and 59 so that these circuits will be ready for the next servo sector.

To finish the discussion of FIG. 5, flip-flop 47, which was set in response to the output of AND gate 46 as a result of detecting the desired record track address, is reset by the output of AND gate 48. In the reset state, flip-flop 47 enables AND gate 66 which, when enabled, passes the output pulse from single-shot 65 to reset flip-flop 49. Because of the time delays involved in the circuitry, flip-flop 49 will be reset only when the desired address has not been detected. The transducer servo apparatus, which is of conventional design, now has all of the information it requires to operate. Specifically, the transducer servo apparatus is provided with an indication from flip-flop 49 as to whether it is in a search mode or a servo mode and, if in the servo mode, information from sample and hold circuit 61 as to the position error.

Of particular advantage, the present invention allows not only absolute track addressing with no additional usage of record surface, but also permits the use of the same transducer for writing the servo sector data as for reading data in both the servo sector field and the data field. This advantage is achieved because the widths of blocks A and B in the servo sector are the same width as a recorded data track in the data field. In other words, these widths correspond to the width of the recording gap in the transducer itself. Obviously, this simplifies the making of the record disc, but, just as important, an even greater density of recorded data in the radial direction can be achieved according to the invention.

Figure 6:
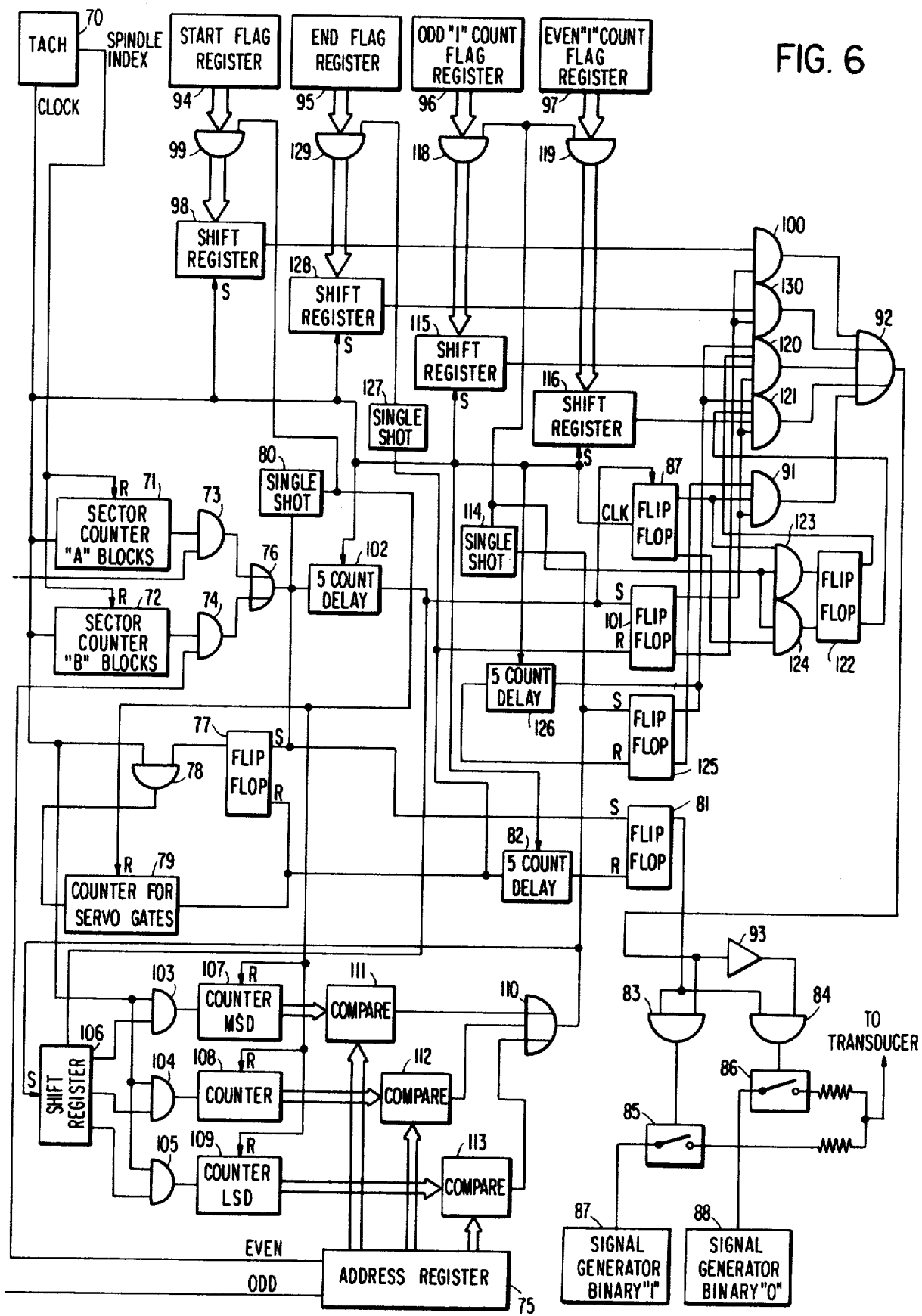
FIG. 6 is a block and logic diagram of the control circuitry used to generate the signals having the sliding modulo address code embedded in the integration signal to be recorded on the record medium in a selected integration area.

Reference is now made to FIG. 6 which shows an example of circuitry which may be used to make the record disc according to the invention. Timing pulses are generated by a tachometer 70 which is connected to the spindle which drives the record disc. The tachometer 70 is of conventional design and provides two outputs. One output is the spindle index pulse which occurs once each revolution of the record disc. The second output is a clock pulse output having a frequency equal to the data clock for the servo sectors. The number of servo sectors on the record disc is determined by sector counters 71 and 72. Sector counter 71 provides an output at the beginning of each one of the A blocks, whereas sector counter 72 provides an output at the beginning of each one of the B blocks. Both of sector counters 71 and 72 receive as count inputs, the clock pulses from the tachometer 70 and are reset by the spindle index pulse from tachometer 70. The output of sector counter 71 is selected by enabling AND gate 73, and the output of sector counter 72 is selected by enabling AND gate 74. These AND gates are respectively enabled by the odd or even output from address register 75 which stores the desired address to be encoded. Thus, if the desired address to be encoded is an odd-numbered address, AND gate 73 will be enabled so that that address will be encoded in block A.

Alternatively, if the desired address to be encoded is an even-numbered address, AND gate 74 is enabled so that that address will be encoded in block B. The outputs of AND gates 73 and 74 are supplied by way of OR gate 76 to set flip-flop 77. Setting flip-flop 77 enables AND gate 78, which then passes clock pulses to counter 79. Counter 79 defines the duration of the blocks A and B, and is reset at the beginning of each one of these blocks by an output pulse from single-shot 80 in response to an output from OR gate 76.

The output of OR gate 76 also sets flip-flop 81 which is used to establish the period of blocks A and B. When counter 79 accumulates a count corresponding to the desired period of blocks A and B, the output of counter 79 is used to reset flip-flop 77, thereby inhibiting further clock pulses to counter 79. The output of counter 79 is also supplied to a five-count delay circuit 82 which may be simply a five-bit shift register clocked by clock pulses from tachometer 70. The output of five-count delay circuit 82 is used to reset flip-flop 81. Flip-flop 81, when set, enables AND gates 83 and 84, which in turn control analog switches 85 and 86, respectively. The input of analog switch 85 is connected to a signal generator 87 which supplies signal bursts corresponding to binary "1", while the input of analog switch 86 is connected to the output of signal generator 88 which supplies signal bursts corresponding to binary "0". The outputs of analog switches 85 and 86 are summed and supplied to the transducer for recording on the record disc.

Actual control of the analog switches 85 and 86 is effected by flip-flop 89 which receives as a clocking input the clock pulses from tachometer 70. Thus, flip-flop 89 performs the function of a one-stage or divide-by-two counter, so that AND gate 91, when enabled, provides an alternating sequence of binary "1's" and "0's" having a frequency half that of the clock pulses from the tachometer 70. This sequence of alternating "1's" and "0's" is supplied through OR gate 92 to AND gate 83 and via inverter 93 to AND gate 84. The result is that a series of alternating signal bursts from the signal generators 87 and 88 are recorded in the servo sector by means of the transducer.

The manner in which this alternating sequence of signal bursts corresponding to binary "1's" and "0's" is altered according to the desired address code will now be described. First of all, the binary codes corresponding to the start flag, end flag, odd "1" count flag and even "1" count flag are respectively stored in registers 94, 95, 96 and 97. These registers are not necessarily separate registers but could be a single read only memory (ROM). As will be remembered with reference to FIG. 2, it is first necessary to generate the start flag for encoding into the servo sector. The start flag occurs toward the beginning of each of the blocks A and B so that the output of single-shot 80 is used to gate the start flag code in register 94 into shift register 98 by means of AND gate 99. Shift register 98 is a five-bit shift register which is loaded in parallel and serially shifted by means of the clock pulses from the tachometer 70. The output of shift register 98 is supplied to AND gate 100 and thence to OR gate 92. AND gate 100 is enabled by flip-flop 101 when it is in its initial reset condition. At the same time, flip-flop 101 inhibits the output of AND gate 91 when that flip-flop is in its reset condition.

Thus, the start flag is encoded, instead of the alternating sequence of "1's" and "0's" as would be the case if AND gate 91 were enabled. Flip-flop 101 is set by an output from five-count delay circuit 102 which is, in turn, initiated by an output from OR gate 76. Thus, flip-flop 101 is set after the start flag has been recorded, thereby enabling AND gate 91 so that the alternating sequence of binary "1's" and "0's" is then recorded.

The clock pulses from tachometer 70 are supplied to each of AND gates 103, 104 and 105. These AND gates are sequentially selected by three-bit shift register 106 so that clock pulses are supplied to counters 107, 108 and 109 in sequence. A binary "1" is read into the first stage of shift register 106 in response to the output of five-count delay circuit 102, and this binary "1" is then shifted through the stages of the shift register by the output of OR gate 110. OR gate 110 receives as its inputs, the outputs of comparator circuits 111, 112 and 113. These comparator circuits are respectively supplied with inputs from counters 107, 108 and 109 and the address register 75. Thus, when there has been accumulated in counter 107 a count corresponding to the most significant digit of the desired decimal address, an output will be generated by comparator circuit 111 which is supplied via OR gate 110 to the shift input of shift register 106. Similar shift pulses are generated by each of the comparator circuits 112 and 113.

When OR circuit 110 provides an output, it is necessary to insert one of the count flag codes into the encoded servo data. This operation is accomplished by generating a sampling pulse with single-shot 114 in response to the output of OR gate 110. This sampling pulse is used to load shift registers 115 and 116 with the contents of registers 96 and 97, respectively, by means of AND gates 118 and 119. Shift registers 115 and 116 are, like shift register 98, five-bit shift registers which are loaded in parallel and serially shifted in response to the clock pulses from tachometer 70. The output of shift register 115 is supplied to AND gate 120, while the output of shift register 116 is supplied to AND gate 121. Which one of AND gates 120 and 121 is selected is determined by flip-flop 122. At the time when single-shot 114 produces an output pulse, the state of flip-flop 89 is sampled by AND gates 123 and 124, and this is the state assumed by flip-flop 122. Remembering again that flip-flop 89 operates as the first stage of a counter, the state of flip-flop 89 indicates whether the number of binary "1's" counted up to that instant of time is an odd number or an even number. If it is an odd number, AND gate 120 will be enabled, thereby passing the output from shift register 115 to OR gate 92. On the other hand, if the number of binary "1's" counted up to that point in time is an even number, then AND gate 121 will be enabled, thereby passing the output of shift register 116 to OR gate 92.

AND gates 120 and 121 are further enabled by flip-flop 125 which is set by the output of OR gate 110. The output of flip-flop 125 not only enables AND gates 120 and 121, but it also initiates the five-count delay circuit 126. The output of five-count delay circuit 126 resets flip-flop 125 with the result that AND gates 120 and 121 are inhibited and the output of AND gate 91 once again passes to OR gate 92.

At the end of the servo sector block, the end flag code is inserted into the coded servo data. The end of the servo sector block is determined by the output of counter 79 which triggers a single-shot 127. The output of the single-shot 127 is used to read the contents of register 95 into shift register 128 by means of AND gate 129. The output of counter 79 again resets flip-flop 101, thereby inhibiting AND gate 91 and enabling AND gate 130. The output of shift register 128 is thus supplied to OR gate 92.

It is to be understood that the circuitry shown in FIG. 6 is presented by way of example only. Those skilled in the art will be able to devise other ways to make the record disc according to the invention. The important thing to be recognized is that the invention provides significant improvements in record members of the flexible disc memory type. By embedding the record track addresses in the servo blocks, the servo blocks can be used for both record track identification and null servo track following. By implementing a particular position error signal algorithm in the transducer positioning system using the record member according to the invention, improved repeatable servoing of the transducer is achieved. In summary, the invention provides significant advantages over the prior art including greater density of recording on the record medium surface, more accurate track following and improved yield in the manufacture of the record medium.

I claim:

1. A record member having a plurality of servo sector areas, including servo track follow integration areas comprising equal numbers of signal bursts respectively representing binary "1" and binary "0", the improvement comprising a predetermined arrangement of said signal bursts to identify a plurality of record track location lines, said predetermined arrangement being characterized by the insertion of one of first or second binary codes which exhibit high self-correlation properties at positions within said integration areas corresponding to a consecutive number of said signal bursts equal to a digit in an address identifying one of said track location lines, said first and second binary codes bring complements and composed of an odd number of said signal bursts and being selected so as to maintain the number of signal bursts representing binary "1" and binary "0" in said servo track follow integration areas equal.

2. A record member as recited in claim 1 wherein said servo track follow integration areas are immediately preceded and succeeded by a plurality of signal bursts representing third and fourth binary codes which exhibit high self-correlation properties but which are different from said first and second binary codes, said third and fourth binary codes being complements and composed of an odd number of said signal bursts.

3. A record member as recited in claim 1 wherein said servo sector areas are divided transversely to said record track location lines with said servo track follow integration areas being alternately located in the divided portions of said servo sector areas, adjacent servo track follow integration areas having a common boundary coincident with one of said record track location lines, one group of said servo track follow integration areas having a predetermined arrangement of said signal bursts to identify odd-numbered record track location lines, and the other group of said servo track follow integration areas having a predetermined arrangement of said signal bursts to identify even-numbered record track location lines.

4. In a transducer positioning system of the type comprising a transducer mounted on positioning means for movement adjacent the surface of a record member in a direction transverse to record track lines on said record member, and means for imparting relative movement between said record member and said transducer in a direction parallel to said record track lines, the improvement comprising:

(a) said record member having a plurality of sector areas, including servo track follow integration areas comprising equal numbers of signal bursts respectively representing binary "1" and binary "0" in a predetermined arrangement to identify a plurality of record track location lines, said predetermined arrangement being characterized by the insertion of one of first or second binary codes, which exhibit high self-correlation properties, at positions within said integration areas, which positions correspond to a consecutive number of said signal bursts equal to a digit on an address identifying one of said track location lines, said first and second binary codes being complements and composed of an odd number of said signal bursts and being selected so as to maintain the number of signal bursts representing binary "1" and binary "0" in said servo track follow integration areas equal; and (b) transducer position drive means having a search mode for detecting addresses of said record track location lines and a servo mode for centering said transducer with respect to a selected one of said record track location lines, said transducer position drive means including:

(i) a decoder connected to said transducer and responsive to said signal bursts generated by said relative movement between said record member and said transducer for producing output signals representing binary "1" and binary "0" according to said predetermined arrangement;

(ii) code detector means connected to said decoder for detecting said first and second binary codes and generating a control sisgnal in response thereto;

(iii) an address counter responsive to said control signal and counting at the repetition rate of said decoder output signals to generate the address identifying the tract location line proximate to said transducer;

(iv) an address comparator receiving the output of said address counter for comparing the same with a preselected address to detect when said transducer is proximate to the track location line having said preselected address; and (v) integration means connected to said transducer and responsive to said signal bursts generated by the relative movement between said record member and said transducer for generating a track error signal for maintaining said transducer proximate to said track location line having said preselected address.

5. A transducer positioning system as recited in claim 4 wherein said servo sector areas are divided transversely to said record track location lines with said servo track follow integration areas being alternately located in the divided portion of said servo sector areas, adjacent servo track follow integration areas having a common boundary coincident with one of said track location lines, said integration means comprising:

(a) at least a first integrator having positive and negative inputs; and (b) switching means for supplying rectified signal bursts from an integration area in one of said divided portions to the positive or negative input of said first integrator and rectified signal bursts from an integration area in another of said divided portions to the negative or positive input of said first integrator according to whether the preselected address of said track location line is an odd or an even number.

6. A transducer positioning system as recited in claim 5 wherein said integration means further comprises:

(a) a second integrator having a summing input connected to receive the outputs of said switching means; and (b) a divider receiving as inputs the outputs of said first and second integrators, the output of said divider being proportional to the output of said first integrator divided by the output of said second integrator.

* * * * *